(12) United States Patent
Lu (10) Patent No.: US 8,473,696 B2
(45) Date of Patent: Jun. 25, 2013

(54) ADAPTIVE BUFFER DEVICE AND METHOD THEREOF

(75) Inventor: Yen-Ju Lu, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 655 days.

(21) Appl. No.: 12/535,157

(22) Filed: Aug. 4, 2009

(65) Prior Publication Data

US 2010/0058022 A1    Mar. 4, 2010

(30) Foreign Application Priority Data

Aug. 6, 2008   (TW) ................. 97129816 A (51) Int. Cl.
*G06F 12/00*    (2006.01)

(52) U.S. Cl.
USPC ................. 711/156; 711/E12.069

(58) Field of Classification Search
USPC ........................................... 711/156
See application file for complete search history.

(56) References Cited

U.S. PATENT DOCUMENTS

| 4,805,098 A | 2/1989 | Mills, Jr. et al. |
| 5,809,228 A | 9/1998 | Langendorf et al. |
| 6,415,365 B1 | 7/2002 | Flynn |

*Primary Examiner* — Reginald Bragdon
*Assistant Examiner* — Hamdy S Ahmed
(74) *Attorney, Agent, or Firm* — McClure, Qualey & Rodack, LLP (57) ABSTRACT

An adaptive buffer device includes a plurality of entries each including an address field and a record block, and a control unit for selectively setting each entry to one of a normal status and a transformed status. When the control unit sets a first one of the entries to the normal status, the address field thereof records a first address, and the record block thereof records data corresponding to the first address and data corresponding to addresses adjacent to the first address. When the control unit sets a second one of the entries to the transformed status, the control unit reconfigures the address field and the record block thereof into a plurality of units, each of which includes a second address, data corresponding to the second address, and data corresponding to addresses adjacent to the second address. In addition, an adaptive buffer method is also disclosed.

13 Claims, 9 Drawing Sheets

| valid field | status field | enable field | address field | record field |||||||||  |
|---|---|---|---|---|---|---|---|---|---|---|---|---|
| | | | | s7 | s6 | s5 | s4 | s3 | s2 | s1 | s0 | |
| | | | | | | | | | | | | entry 3 |
| 100 | 0 | 00100000 | 0x1520 | | | D6 | | | | | | entry 2 |
| 100 | 0 | 00001100 | 0x3200 | | | | | D5 | D4 | | | entry 1 |
| 100 | 0 | 00011011 | 0x1000 | | | | D7 | D3 | D2 | D1 | | entry 0 |

FIG. 5

| | | s7 | s6 | s5 | s4 | s3 | s2 | s1 | s0 | | | | |
|---|---|---|---|---|---|---|---|---|---|---|---|---|---|
| | | | | | | | | | | | | | entry 3 |
| | | | | D6 | D11 | | | | | 0x00a0 | 00010000 | 0 | 100 |
| | | | | | | | | | | 0x1520 | 00100000 | 0 | 100 |
| | | | | | | D5 | D4 | | D9 | 0x3200 | 00001101 | 0 | 100 | entry 2
| | | D10 | D8 | | D7 | D3 | | D2 | D1 | 0x1000 | 11011011 | 0 | 100 | entry 1
| | | | | | | | | | | | | | entry 0 | record field / address field / enable field / status field / valid field

| valid field | status field | enable field | address field | record field | | | | | | | | |
|---|---|---|---|---|---|---|---|---|---|---|---|---|
| | | | | s7 | s6 | s5 | s4 | s3 | s2 | s1 | s0 | |
| 100 | 0 | 01000000 | 0x1500 | | D14 | | | | | | | entry 3 |
| 111 | 1 | 01110101 | 0x00b0 | | D11 | 0x6060 | D12 | | 0x60a0 | | D13 | entry 2 |
| 100 | 0 | 00100000 | 0x1520 | | | D6 | | | | | | entry 1 |
| 100 | 0 | 00001101 | 0x3200 | | | | | D5 | D4 | | D9 | entry 0 |

FIG. 9

ADAPTIVE BUFFER DEVICE AND METHOD THEREOF

CROSS-REFERENCE TO RELATED APPLICATION

This application claims priority of Taiwanese Application No. 097129816, filed on Aug. 6, 2008.

BACKGROUND OF THE INVENTION

1. Field of the Invention

The invention relates to buffer storage technology, more particularly to an adaptive buffer device and a method thereof.

2. Description of the Related Art

Figure 1:
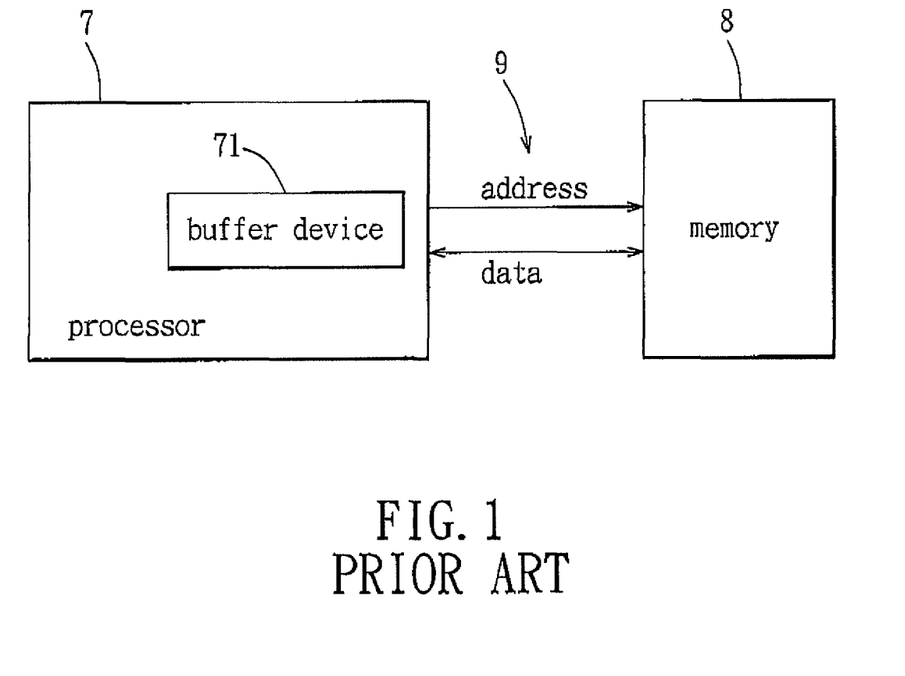
FIG. 1 is a block diagram to illustrate how computational data from a processor are written to an external memory.

Referring to FIG. 1, in a conventional circuit design, a processor 7 writes computational data to an external memory 8. However, since the processor 7 generally operates at a speed far higher than that of the memory 8, a built-in buffer device 71 is often used to store the computational data temporarily without stalling the processor, so as to prevent a reduction in efficiency due to constraints attributed to the memory 8.

When a conventional buffer device receives from the processor 7 a plurality of adjacent items of data (data width equals to a word) and corresponding addresses, the data and the addresses will be recorded respectively in a plurality of data entries each having a storage width of one word and a plurality of address entries. If the buffer device supports write merge, when the corresponding addresses of a part of the adjacent items of data are ascendingly consecutive, they can be merged into a burst write command for a system bus 9 to serve as a basis for transmission of that part of the adjacent items of data. Although such a method does not require transmission of the addresses of all the data one by one and hence can reduce the amount of data to be sent via the system bus 9, since the storage width of each data entry can contain only one item of data, write merge is possible only when the addresses of the adjacent items of data are ascendingly consecutive. Thus, the probability of performing write merge is low.

Another conventional buffer device expands the storage width of each data entry to four words. Before the buffer device is made full by writing, data with consecutive addresses can be recorded in the same data entry. Therefore, even if the data with consecutive addresses are not written to the buffer device in sequence, there are chances that they may still be merged. However, in situations where the addresses of several adjacent items of data are not consecutive, it is possible that a data entry only records an item of data, thereby resulting in considerable waste of storage space.

In addition, there is prior art in which an entry can be configured to record either an address or data, which is different from the aforementioned conventional buffer devices which require preparation of address entries and data entries. When a previous address and a current address are ascendingly consecutive, it is only necessary to record the corresponding current data, and there is no need to record the current address. Moreover, the current data can be merged with the corresponding previous data into a burst write command. However, it the addresses are not ascendingly consecutive, both the address and the data need to be recorded. Since only adjacent items of data can be merged, it is still difficult to reduce the amount of data for the system bus 9.

SUMMARY OF THE INVENTION

Therefore, an object of the present invention is to provide an adaptive buffer device and method to permit flexible adjustment of a storage device, which can effectively merge data so as to reduce the amount of data through a system bus. Moreover, structural flexibility helps increase utilization of storage space.

Accordingly, the adaptive buffer device of this invention comprises: a plurality of entries, each of which includes an address field and a record block; and a control unit for selectively setting each of the entries to one of a normal status and a transformed status; wherein, when the control unit sets a first one of the entries to the normal status, the address field of the first one of the entries is for recording a first address, and the record block of the first one of the entries is for recording data to which the first address corresponds, and data to which any other address adjacent to the first address corresponds; and when the control unit sets a second one of the entries to the transformed status, the control unit reconfigures the address field and the record block of the second one of the entries into a plurality of units, the units being for recording a second address, data to which the second address corresponds, and data to which any other address adjacent to the second address corresponds.

An adaptive buffer method of this invention is adapted for an adaptive buffer device that includes a plurality of entries, each of the entries including a record block for recording data with adjacent addresses, the record blocks being settable to one of a normal status and a transformed status. The method comprises the following steps: receiving data and determining whether the received data can be written to one of record fields with adjacent addresses according to an address corresponding to the received data; if the received data cannot be written to any one of the record fields of the record block with adjacent addresses, determining whether any of the entries can be changed from the normal status to the transformed status; and if none of the entries can be changed from the normal status to the transformed status, outputting the data recorded in the record fields and subsequently writing the received data; wherein, changing from the normal status to the transformed status involves reconfiguring an address field and the record block of at least one of the entries into a plurality of units, wherein at least one of the units is an empty unit with no data written therein.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
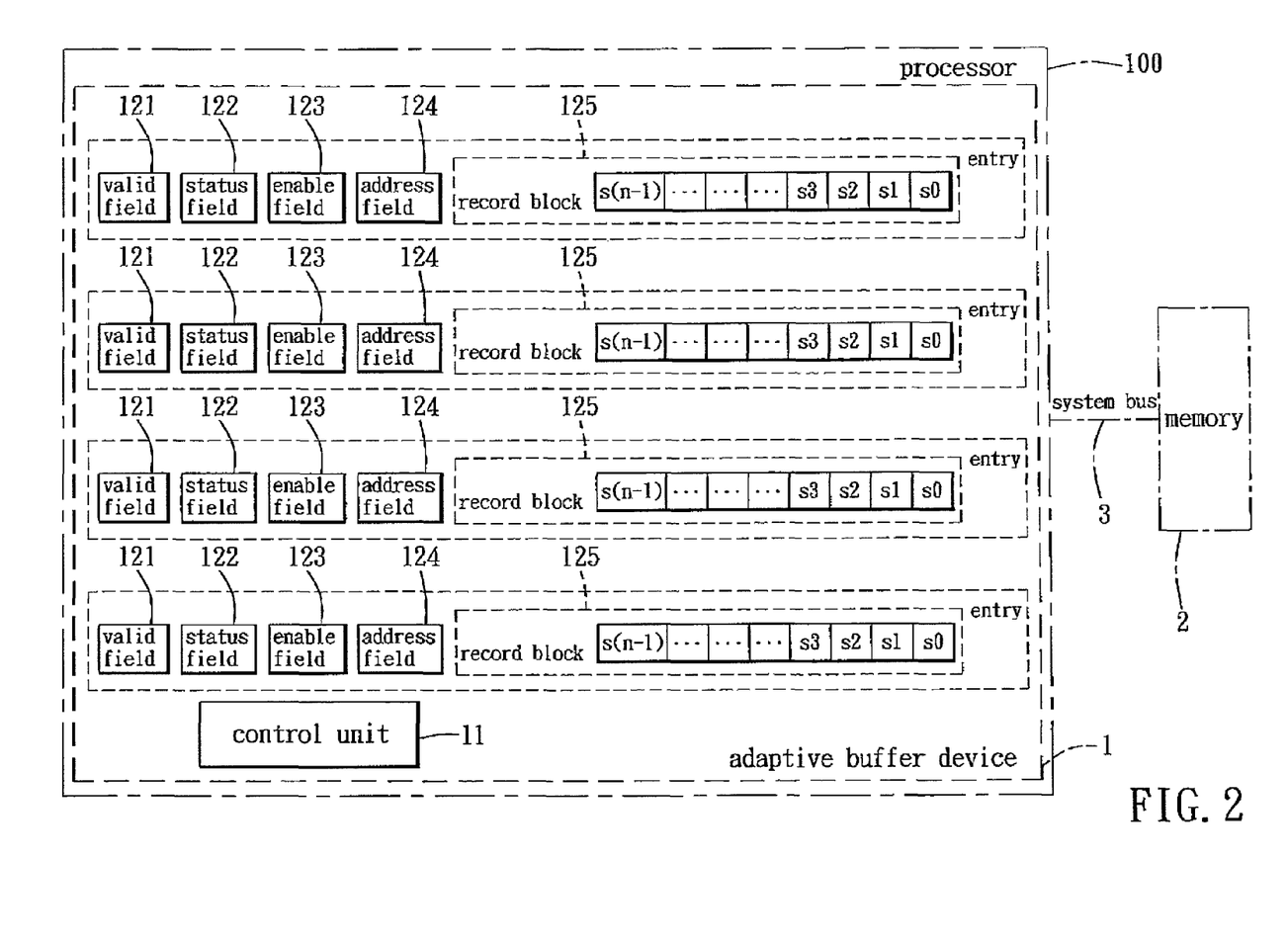
FIG. 2 is a block diagram illustrating the preferred embodiment of an adaptive buffer device according to the present invention which is built in a processor and which writes data to a memory.

Referring to FIG. 2, the preferred embodiment of an adaptive buffer device 1 according to the present invention is adapted for use in a processor 100, and can store computational data of the processor 100 temporarily and transmit the data to a memory 2 through a system bus 3.

The adaptive buffer device 1 includes a control unit 11 and a plurality of entries. Each of the entries includes a valid field 121, a status field 122, an enable field 123, an address field 124, and a record block 125. The record block 125 includes n record fields s(n-1), . . . , s3, s2, s1, s0.

The control unit 11 can be used to set the value of each field of the entries. When the value is set to "0," this indicates that the corresponding entry is in a normal status. When the value is set to "1," this indicates that the corresponding entry is in a transformed status. In this embodiment, all the entries are preset to the normal status. It should be noted that, whether the set value is "0" or "1," it only serves to clearly express the operational content of this embodiment, and any set values as stated herein should not serve to limit the scope of protection sought for the invention.

When the control unit 11 sets an entry to the normal status, the address field 124 of the entry can record an address written by the control unit 11, and the record fields s(n-1)~s0 of the entry can record at least one item of data associated with the written address. The associated item of data includes data corresponding to the written address or data corresponding to other (n-1) addresses adjacent to the written address, where n is the number of fields of the record block 125.

To illustrate using an example: supposing n=8, and the address recorded in the address field 124 is 0x1000, and supposing an address difference between two adjacent addresses is 4, the record fields s0~s7 can record only data corresponding to addresses 0x1000, 0x1004, 0x1008, 0x100c, 0x1010, 0x1014, 0x1018, and 0x101c, and these data are associated with the address 0x1000 recorded in the address field 124.

When the control unit 11 sets an entry to the transformed status, the control unit 11 reconfigures the address field 124 and the record block 125 of the entry into a plurality of units. Each of the units is used to record an address written by the control unit 11, and at least one item of data associated with the written address. The associated data include data corresponding to the written address or data corresponding to other (m-2) addresses adjacent to the written address, where m is the number of fields of each unit.

Figure 7:
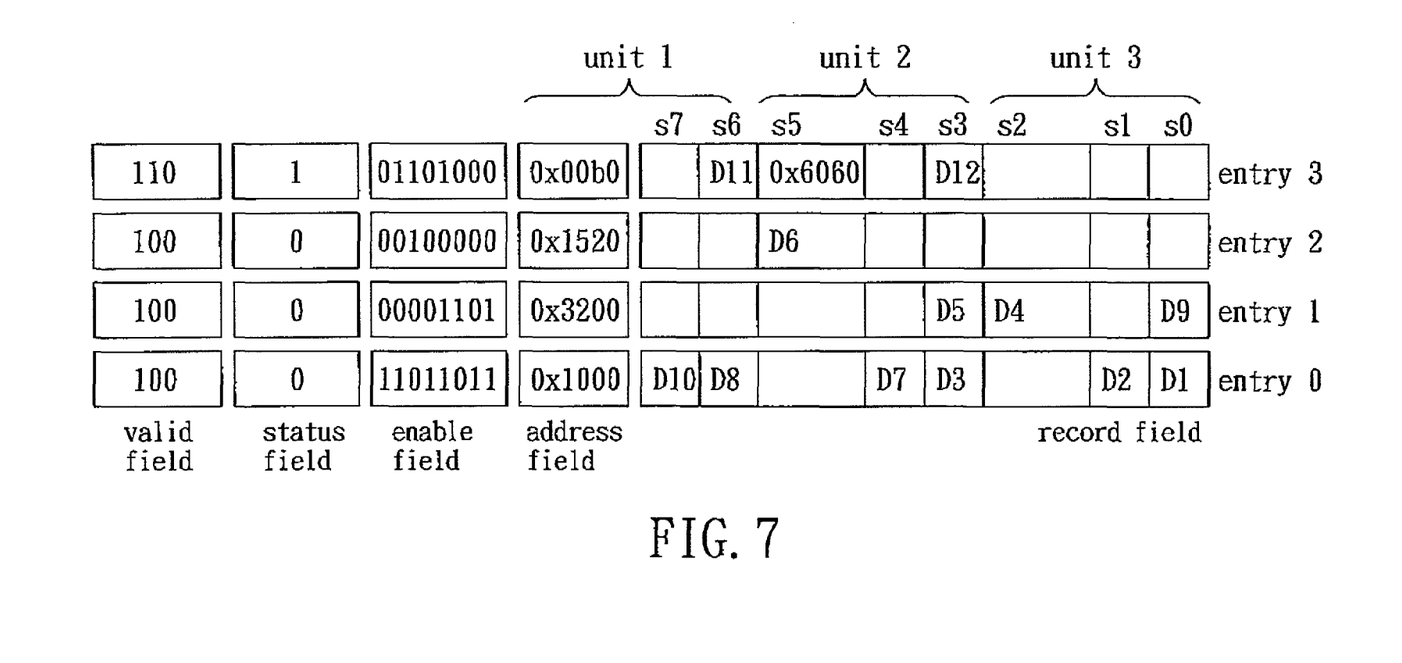
FIG. 7 is a schematic diagram illustrating that one of the entries is set to a transformed status.

For instance, referring to entry 3 in FIG. 7, unit 1 includes an address field 124 and record fields s7, s6, unit 2 includes record fields s5~s3, and unit 3 includes record fields s2~s0. The address field 124 of unit 1 is used to record an address, whereas the record fields s7, s6 are used to record associated data. The record field s5 of unit 2 is used to record an address, whereas the record fields s4, s3 are used to record associated data. The record field s2 of unit 3 is used to record an address, whereas the record fields s1, s0 are used to record associated data.

The control unit 11 also sets the value of each valid field 121. When an entry is set to the normal status, the value of the valid field 121 thereof is preset to 100. When the entry is in the transformed status, bits in the valid field 121 respectively represent validities of the units of the entry. Referring further to entry 3 in FIG. 7, when there are data recorded in units 1 and 2 and there is no data in unit 3, the value of the valid field 121 can be set to 110.

The control unit 11 also sets the value of each enable field 123. The value of each enable field 123 has multiple bits, and the bits respectively correspond to whether there are recorded data in the corresponding record fields s(n-1)~s0. If there are recorded data in the corresponding record field, the bit value may be set to "1." Otherwise, the bit value is set to "0."

Figure 3:
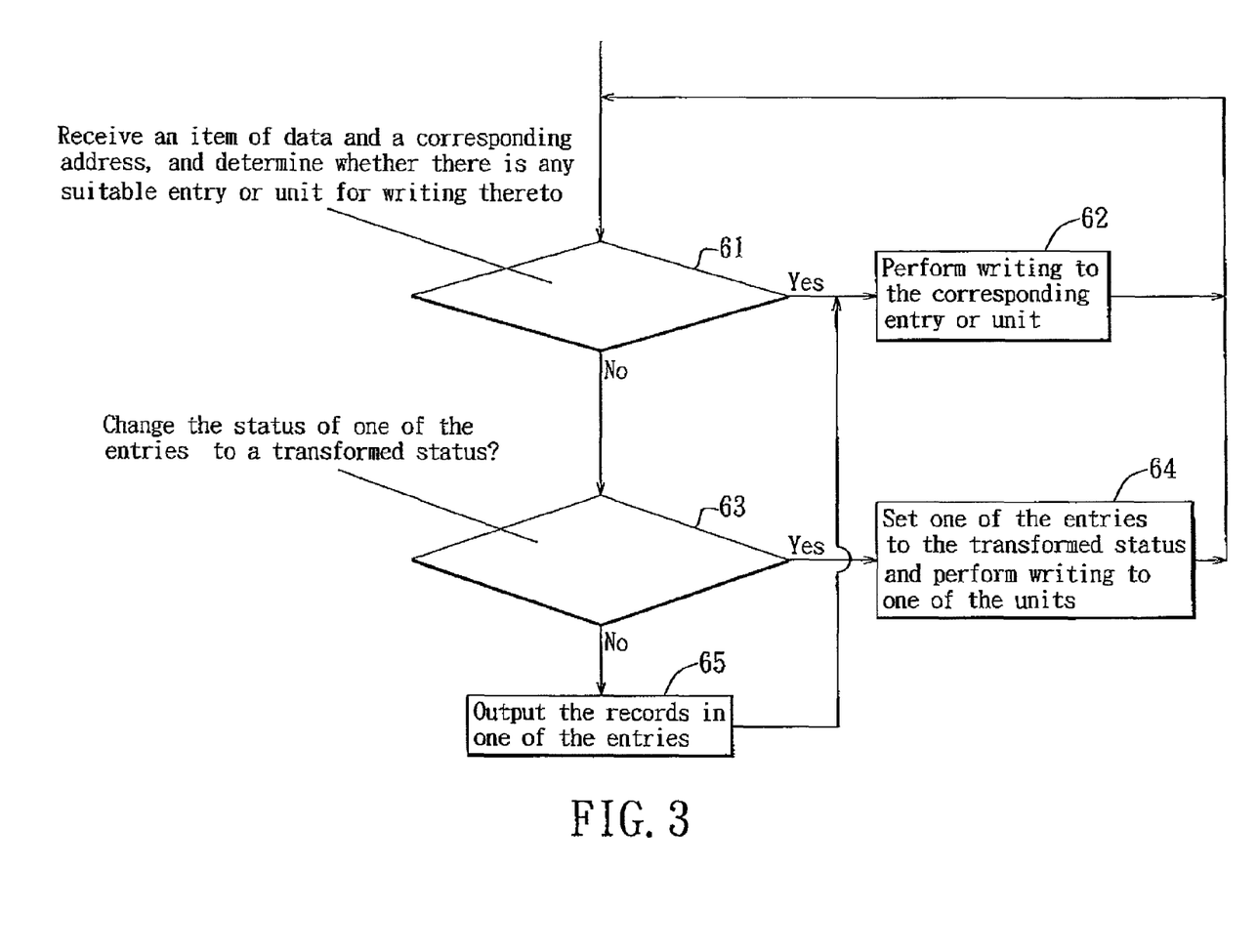
FIG. 3 is a flowchart to illustrate the preferred embodiment of an adaptive buffer method according to the present invention.

Referring to FIG. 3, an adaptive buffer method to be executed by the adaptive buffer device 1 according to the preferred embodiment of the invention includes the following steps:

In step 61, the control unit 11 receives an item of data and an address corresponding to the data, and determines whether there is any suitable record block 125 of an entry or unit to which the data and the corresponding address can be written.

Figure 4:
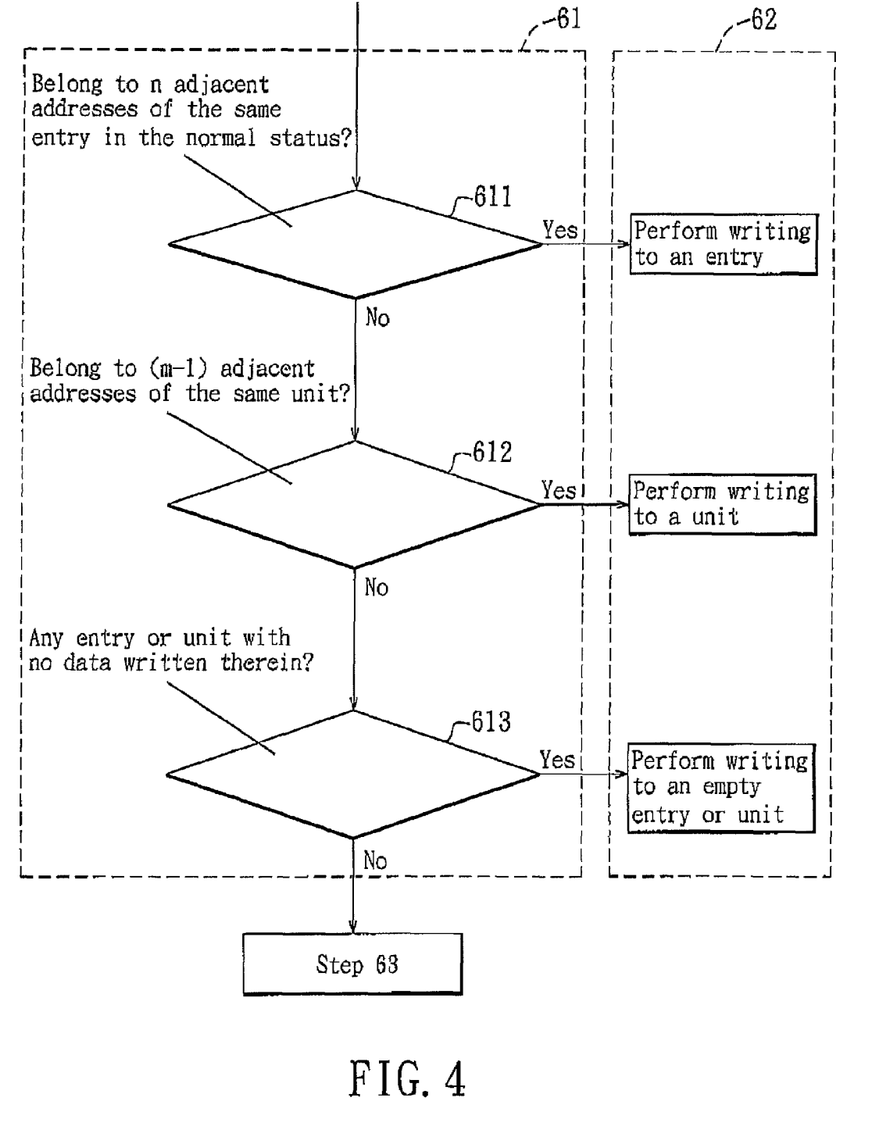
FIG. 4 is a flowchart to illustrate the determination of a suitable entry or unit available for data writing.

With reference to FIG. 4, step 61 includes the following sub-steps:

In sub-step 611, it is determined whether the address corresponding to the received data and the address corresponding to any one item of data in the record block 125 belong to n adjacent addresses of the same entry in the normal status. If so, the flow goes to step 62. If not, the flow goes to sub-step 612.

In sub-step 612, it is determined whether the address to which the received data corresponds and the address to which any one item of data in the record block 125 corresponds belong to (m-1) adjacent addresses of the same unit. If so, the flow goes to step 62. If not, the flow goes to step 613.

The purpose of executing sub-steps 611 and 612 is to bring together data with consecutive or adjacent addresses to facilitate subsequent recording in the same entry or unit so that the assembled data can be merged as a single output to the memory 2.

In sub-step 613, it is determined whether there is any entry or unit with no data-written therein. If so, the flow goes to step 62. If not, it is determined that the data cannot be written to any of the entries or units, and the flow goes to step 63.

In step 62, the control unit 11 writes the received data or the address corresponding to the received data to the corresponding entry or unit determined in step 61, and the flow returns to step 61.

More specifically, the control unit 11 will write the received data to the entry including the record block 125 and modify the value of the enable field 123 upon determining in sub-step 611 that the address corresponding to the received data and the address to which any item of data in the record block 125 corresponds belong to (n) adjacent addresses of the same entry in the normal status.

Upon determining in sub-step 612 that the address corresponding to the received data and the address to which any item of data in the record block 125 corresponds belong to (m-1) adjacent addresses of the same unit, the control unit 11 will write the received data to the unit belonging to the record block 125 and modify the value of the enable field 123.

Upon determining in sub-step 613 that there is any entry or unit with no data written therein, the control unit 11 will convert the corresponding address of the received data to a reference address and write the reference address and the received data to an empty entry or unit, and will modify the values of the enable field 123 and the valid field 121 depending on requirements. It should be noted herein that there is no restriction on the manner of converting the corresponding address of the received data to the reference address, as long as the corresponding address of the received data is caused to belong to the n addresses (where n is the number of fields of each record block 125) associated with the reference address when writing to the empty entry, or the corresponding address of the received data is caused to belong to (m-1) addresses (where m is the number of fields of each unit) associated with the reference address when writing to the empty unit. Therefore, the value of the reference address can be the same as the corresponding address of the received data, i.e., no conversion is necessary, and the received data and the corresponding address of the received data are directly written to the entry (or the unit when the entry is transformed). For instance, if the corresponding address of the received data is 0x1534, the reference address can be 0x1520 or 0x1534.

Referring back to FIG. 3, in step 63, the control unit 11 determines whether the status of one of the entries is to be changed to the transformed status according to the recording state of each field. If so, the flow goes to step 64. If not, the flow goes directly to step 65. In this embodiment, the status of the last entry is changed. However, the invention is not limited thereto in practice.

That is to say, if there is at least one of the entries which may include an empty unit having no data written therein in the transformed status, the control unit 11 will set said at least one entry to the transformed status. If the entries still do not include any empty unit having no data written therein in the transformed status, the control unit 11 will not execute status transformation, e.g., if almost all the fields of the record block 125 have data written thereto so that it is not suitable to modify the record block 125, or if no unit can be made available for writing of the received data after executing the status transformation.

In step 64, one of the entries is set to the transformed status, and the corresponding record block 125 is reconfigured into a plurality of units. The data and address originally recorded in the entry are put in one of the units, and the recorded address value is modified depending on requirements. Furthermore, at least one of the units is an empty unit having no data written therein. The control unit 11 can convert the corresponding address of the received data to a reference address, and write the reference address and the received data to the empty unit. In addition, the value of the status field 122 is further set to "1," and the valid field 121 and the enable field 123 are modified. The flow then goes back to step 61.

Figure 6:
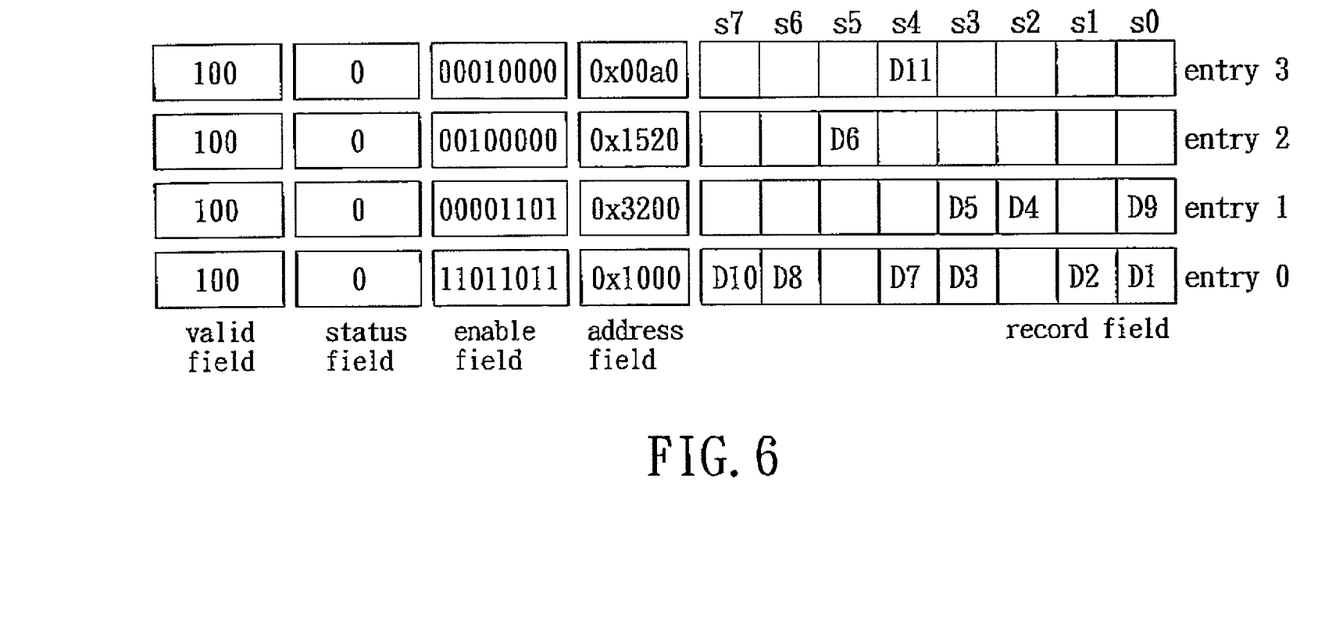
FIG. 6 is a schematic diagram illustrating that an item of data is written to an entry that initially has no data written thereto.

To illustrate using an example, referring to entry 3 in FIG. 6, it is assumed that entry 3 has recorded an item of data D11 (with a corresponding address 0x00b0) and a reference address 0x00a0. When entry 3 needs to be reconfigured into a plurality of units so as to continue with recording of a next item of data, referring to entry 3 of FIG. 7, entry 3 is reconfigured into three units: unit 1 to unit 3. Moreover, the item of data D11 is moved to unit 1, i.e., D11 is moved from field s4 to field s6, and the address recorded in the address field 124 is modified to 0x00b0. In addition, the next item of data, D12 (with a corresponding address 0x6060), is written to unit 2, i.e., field s3, and the address 0x6060 is written to field s5.

In step 65, the control unit 11 stalls the writing operation of the processor 100, and outputs the record in one of the entries (e.g., entry 0) to the memory 2 through the system bus 3, and moves the rest of the entries forward so as to release the last entry (e.g., entry 3) (i.e., generating an entry which has no data written therein). The flow then goes back to step 62. It is worth noting that, during outputting, for the entries in the normal status, the items of data in each entry are write-merged before being outputted, whereas, for the entries in the transformed status, the items of data in the same unit are write-merged before being outputted. Moreover, the data can be outputted only one unit at a time. There is no need to output the data in all the units of the entry in one operation. In this manner, a unit having no data written therein can be generated.

A simple example is provided below to illustrate the flow of the adaptive buffer method according to the invention. Assuming the items of data delivered in sequence to the buffer device are D1, D2, . . . , D13, D14, and the addresses to which DS to D14 correspond are as shown in the following table:

| Data | D8 | D9 | D10 | D11 | D12 | D13 | D14 |
|---|---|---|---|---|---|---|---|
| Address | 0x1018 | 0x3200 | 0x101c | 0x00b0 | 0x6060 | 0x60a0 | 0x1518 |

Figure 5:
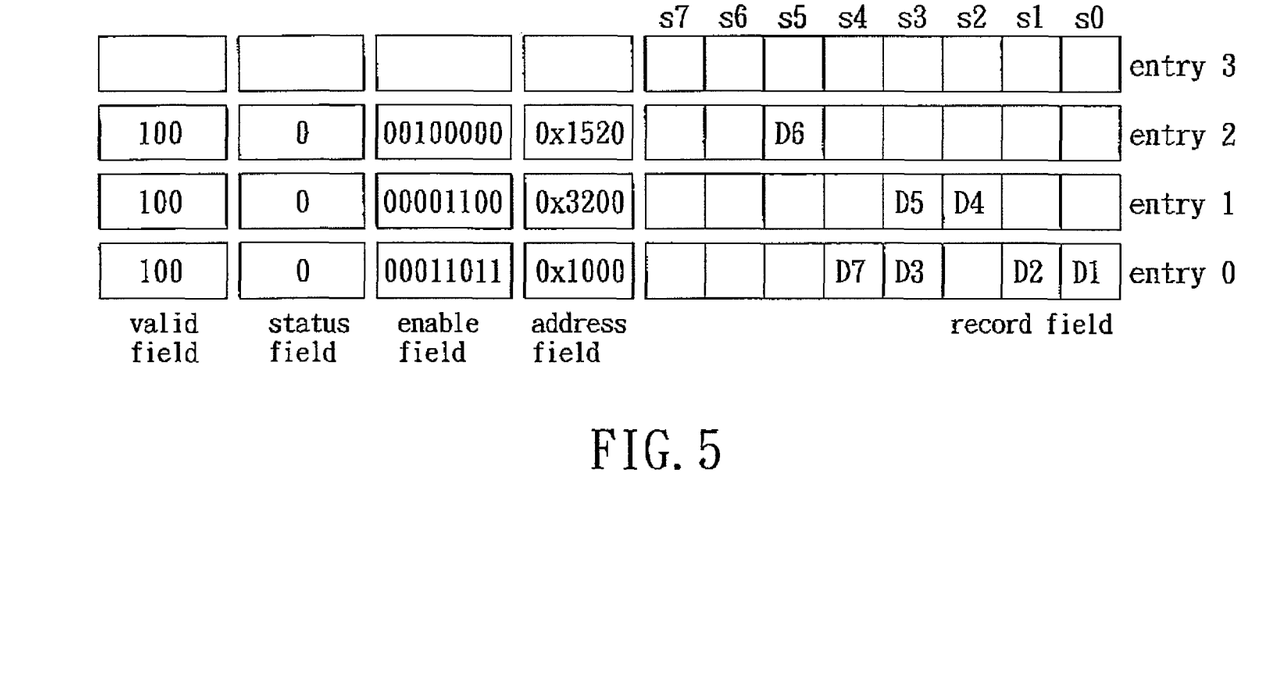
FIG. 5 is a schematic diagram illustrating that all entries are in a normal status.

It is assumed that the write relationships of D1 to D7 in the corresponding entries before D8 is written are such as those shown in FIG. 5.

Since the eight (n=8) addresses associated with the address 0x1000 recorded in entry 0 are 0x1000, 0x1004, 0x1008, 0x100c, 0x1010, 0x1014, 0x1018, 0x101c according to sub-step 611, and since the address to which D8 corresponds is 0x1018, which is one of the eight associated addresses, D8 is written to the record field s6 (as shown in FIG. 6) of entry 0 according to step 62. The value of the enable field 123 of entry 0 is modified to 01011011.

Since the corresponding address, 0x3200, of the next received item of data D9 is the same as the address 0x3200 already recorded in entry 1 according to sub-step 611, D9 is written to the record field s0 of entry 1, and the value of the corresponding enable field 123 is modified to 00011011 (see entry 1 in FIG. 6) according to step 62.

By the same token, D10 (which corresponds to address 0x101c) is written to record field s7 of entry 0 (see entry 0 of FIG. 6) according to sub-step 611 and step 62.

The determination results in sub-steps 611 and 612 with respect to D11 (corresponding address being 0x00b0) are negative. Therefore, the flow goes to sub-step 613. Since entry 3 has no data written therein, as shown in FIG. 6, a reference address 0x00a0 is written to the address field 124 of entry 3, and D11 is written to the record field s4 of entry 3 according to step 62. Moreover, the value of the enable field 123 of entry 3 is modified to 00010000, and the values of the status field 122 and the valid field 121 of entry 3 at this time are 0 and 100, respectively.

Since the determination results in sub-steps 611 to 613 with respect to the next data item D12 (corresponding address being 0x6060) are negative, and since it is determined in step 63 that the status of entry 3 can be transformed, step 64 is executed. Thus, as shown in FIG. 7, the control unit 11 reconfigures entry 3 into three units, moves D11 to unit 1, and modifies the address in the address field 124 to 0x00b0. In addition, D12 is written to unit 2, and the reference address 0x6060 is written to the record field s5.

Figure 8:
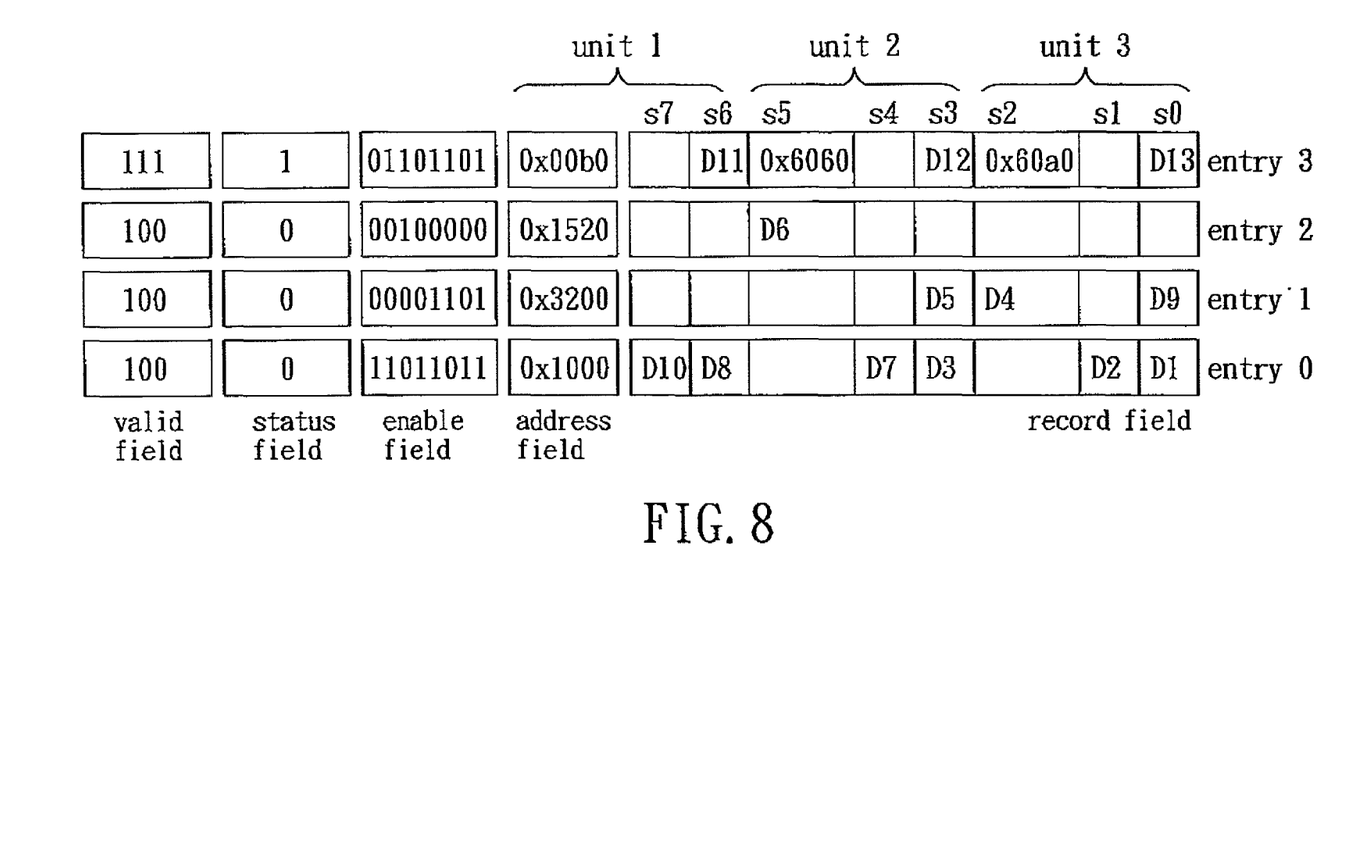
FIG. 8 is a schematic diagram illustrating that an item of data is written to a unit that initially has no data written thereto.

The flow then goes back to step 61 to receive the next item of data D13 (corresponding address being 0x60a0). Since the determination results in sub-steps 611 and 612 with respect to D13 are negative, the flow goes to sub-step 613. Because the determination result in sub-step 613 with respect to D13 is affirmative, as shown in FIG. 8, D13 is written to unit 3 (i.e., the record field s0) of entry 3, and the address 0x60a0 is written to the record field s2.

Figure 9:
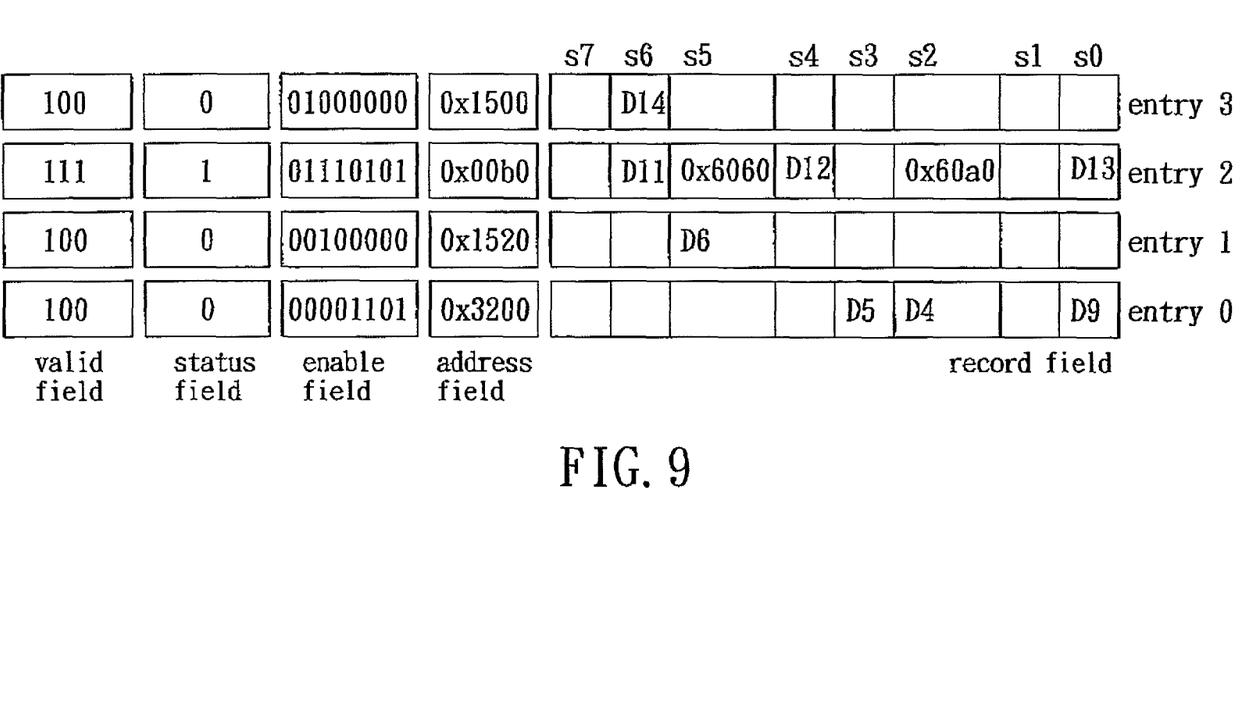
FIG. 9 is a schematic diagram illustrating that records in one of the entries are outputted so as to release an empty entry for writing of data.

The next item of data D14 is received. Since the determination results in sub-steps 611 to 613 and step 63 with respect to D14 are negative, the flow goes to step 65. As shown in FIG. 9, the records in entry 0 are outputted, and the data recorded in the rest of the entries are moved forward in sequence so as to release entry 3 for data writing. The flow then goes back to step 62 to write D14 to entry 3.

In sum, even if the corresponding addresses of the data items are delivered from the processor 100 in a rather irregular order, items of data having consecutive or adjacent addresses can be recorded in the same entry or unit. These items of data can then be write-merged as a burst write command for the system bus 3, i.e., only one notifying address is needed for transmission of a plurality of items of data. Therefore, such arrangement can effectively increase the probability of outputting merged data, thereby reducing the number of address transmissions. Moreover, the amount of data flowing via the system bus 3 can be reduced as well. In addition, since the entries in this embodiment can be converted from the normal status to the transformed status, more recording space can be made available, and the undesirable situation in which each entry can record only one item of data can be avoided to a significant extent.

In a modified embodiment of this invention, when the determination result in step 63 is negative, there is an option of not directly executing step 65. Instead, it is determined whether any entry can be reconfigured into a plurality of units. If so, the flow goes to step 64 to reconfigure such entry into units. However, if the record blocks 125 in all the entries are full and cannot be reconfigured into units, execution of step 65 will be required.

In another modified embodiment of this invention, it may be further determined how many entries are currently available for data writing (i.e., how many entries have record blocks 125 that are completely empty) When it is determined that the number of entries available for data writing is less than a predetermined value, the status of such entries is set to the transformed status and each entry is reconfigured into a plurality of units according to step 64. It should be noted that the timing for determining the reconfiguration into units is not limited to what is disclosed hereinabove.

In yet another modified embodiment of this invention, conversion of the corresponding address of the received data to a reference address in step 62 is executed in a different manner: dividing the corresponding address of the received data by (the address difference×the number of record fields). If the remainder is 0x00, the corresponding item of data is written to the record field s0. If the remainder is 0x04, the corresponding item of data is written to the record field s1. If the remainder is 0x08, the corresponding item of data is written to the record field s2, and so on and so forth. Moreover, the reference address written to the address field 124 points to the address to which the item of data recorded in the record field s0 corresponds. As shown in entry 2 of FIG. 6, since the address to which D6 corresponds is 0x1534, and since 0x1534 divided by (4×8=) 32 gives a remainder of 0x14, D6 is written to the record field s5. Since the address to which the record field s0 corresponds is 0x1520, the reference address written to the address field 124 is 0x1520. It is worth noting that, besides pointing to the record field s0, the reference address written to the address field 124 may also point to another representative record field, such as a record field having data recorded therein.

In sum, the adaptive buffer device and method of this invention supports write merge, and permits adaptive transformation for modifying the record structure of the entries, so that the amount of data flowing via the system bus 3 can be reduced and the storage space of the buffer device 11 can be better utilized.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An adaptive buffer device comprising:
a plurality of entries, each of which includes an address field and a record block; and
a control unit for selectively setting each of the entries to one of a normal status and a transformed status;
wherein, when the control unit sets a first one of the entries to the normal status, the address field of the first one of the entries is for recording a first address, and the record block of the first one of the entries is for recording data to which the first address corresponds, and data to which any other address adjacent to the first address corresponds;
and when the control unit sets a second one of the entries to the transformed status, the control unit reconfigures the address field and the record block of the second one of the entries into a plurality of units, each of the plurality of units being reconfigured for recording a second address, data to which the second address corresponds, and data to which any other address adjacent to the second address corresponds.

2. The adaptive buffer device of claim 1, wherein the any other address adjacent to the first address amounts to (n-1) in number, where n is the number of fields in the record block of the first one of the entries.

3. The adaptive buffer device of claim 1, wherein the any other address adjacent to the second address amounts to (m-1) in number, where m is the number of the units of the second one of the entries.

4. The adaptive buffer device of claim 1, wherein, when received data cannot be written to any of the entries and any of the units, if a third one of the entries is capable of including a unit having no data written therein in the transformed status, the control unit sets the third one of the entries to the transformed status and subsequently executes a write operation, and if none of the entries is capable of including a unit having no data written therein even in the transformed status, the control unit will execute the write operation after outputting records in the entries or the units to make an entry or unit available for writing of data.

5. The adaptive buffer device of claim 4, wherein, when the address corresponding to the received data and the address corresponding to any item of data recorded in one of the record blocks neither belong to adjacent n addresses in a same one of the entries nor belong to adjacent (m-1) addresses in a same one of the units, and when there is no entry or unit with no data written therein, the received data cannot be written to any one of the entries or units, where n is the number of fields of the record block of each of the entries, and m is the number of fields of each of the units.

6. The adaptive buffer device of claim 1, wherein the control unit is capable of write-merging the data in the first one of the entries.

7. The adaptive buffer device of claim 1, wherein the control unit is capable of write-merging the data in a same one of the units of the second one of the entries.

8. The adaptive buffer device of claim 1, wherein each of the entries further includes a status field for setting a current status of each of the entries to one of the normal status and the transformed status.

9. An adaptive buffer method adapted for an adaptive buffer device that includes a plurality of entries, each of the entries including a record block for recording data with adjacent addresses, the record blocks being settable to one of a normal status and a transformed status, the adaptive buffer method comprising the following steps:

receiving data and determining whether the received data can be written to one of record fields with adjacent addresses according to an address corresponding to the received data;

if the received data cannot be written to any one of the record fields of the record block with adjacent addresses, determining whether any of the entries can be changed from the normal status to the transformed status; and if none of the entries can be changed from the normal status to the transformed status, outputting the data recorded in the record fields and subsequently writing the received data;

wherein, changing from the normal status to the transformed status involves reconfiguring an address field and the record block of each of the entries into a plurality of units, wherein at least one of the units is an empty unit with no data written therein, and data in the same entry or the same unit can be write-merged to release an empty entry or unit for writing of data.

10. The adaptive buffer method of claim 9, wherein, in the normal status, the record block of each of the entries has n record fields with adjacent addresses for recording n items of data with adjacent addresses.

11. The adaptive buffer method of claim 10, wherein, in the transformed status, the address field and the record block of each of the entries are reconfigured into a plurality of units, each of which has m fields for recording an address and corresponding data with (m-1) adjacent addresses.

12. The adaptive buffer method of claim 11, wherein receiving data and determining whether the received data can be written to one of record fields with adjacent addresses according to an address corresponding to the received data includes:

determining whether the address corresponding to the received data belongs to one of (n-1) adjacent addresses of one of the entries in the normal status;

determining whether the address corresponding to the received data belongs to one of (m-2) adjacent addresses of one of the units in the transformed status; and determining whether there is any empty entry or unit having no data written therein.

13. The adaptive buffer method of claim 9, wherein when writing the received data to the empty entry or unit having no data written therein, a reference address is written to an address field, and data corresponding to the reference address is written to one of the record fields with adjacent addresses.

* * * * *